United States Patent [19]
Rose et al.

[11] Patent Number: 6,041,216
[45] Date of Patent: Mar. 21, 2000

[54] RADIO COMMUNICATION SYSTEM FOR USE IN TUNNELS

[75] Inventors: Mark D. Rose, Corvallis, Oreg.;
Robert W. Haining, Farnham, United Kingdom

[73] Assignee: Tunnel Radio of America, Inc., Corvallis, Oreg.

[21] Appl. No.: 09/004,057

[22] Filed: Jan. 7, 1998

[51] Int. Cl.$^7$ .............................. H04B 1/60; H04B 15/00
[52] U.S. Cl. ................................. 455/9; 455/523
[58] Field of Search .................... 455/11.1, 523, 455/517, 67.1, 423, 9, 14

[56] References Cited

U.S. PATENT DOCUMENTS

| | | |
|---|---|---|
| 3,609,247 | 9/1971 | Halstead . |
| 4,777,652 | 10/1988 | Stolarczyk et al. . |
| 4,879,755 | 11/1989 | Stolarczyk et al. . |
| 5,093,929 | 3/1992 | Stolarczyk et al. . |
| 5,230,080 | 7/1993 | Fabre et al. . |
| 5,301,082 | 4/1994 | Stolarczyk et al. . |
| 5,404,570 | 4/1995 | Charas et al. . |
| 5,603,080 | 2/1997 | Källander et al. . |

FOREIGN PATENT DOCUMENTS

| | | |
|---|---|---|
| 60-61376 | 2/1987 | Japan . |
| 62-18684 | 12/1988 | Japan . |
| 62-317905 | 9/1989 | Japan . |
| 63-327062 | 9/1990 | Japan . |
| 3-353951 | 10/1993 | Japan . |

*Primary Examiner*—Nguyen Vo
*Assistant Examiner*—N Mehrpour
*Attorney, Agent, or Firm*—Robert D. Varitz, PC

[57] ABSTRACT

A radio communications system is intended for use by trains in a tunnel. This system includes an antenna subsystem which incorporates a radiating coaxial cable disposed along the length of the tunnel and extending beyond the portals thereof, including surface coverage for transition. Plural bi-directional, in-line amplifiers are inserted along the length of the radiating coaxial cable at predetermined intervals for amplifying the RF signals carried by the radiating coaxial cable. A monitoring repeater and a control repeater are provided along with an interface for joining the two repeaters to the radiating coaxial cable. A monitoring subsystem includes an end-of-train device and a head-of-train device. A control subsystem includes the control encoder located in a lead locomotive for encoding control input signals for the lead locomotive, a control transmitter for transmitting the encoded control signal to other locomotives, and a control receiver located in each other locomotive for receiving the encoded control signal.

5 Claims, 3 Drawing Sheets

60 MHz DRIVER AMP

6,041,216

RADIO COMMUNICATION SYSTEM FOR USE IN TUNNELS

FIELD OF THE INVENTION

The communication system of the invention is intended to use in a tunnel, and specifically by railroad trains as they transit a tunnel.

BACKGROUND OF THE INVENTION

Railroad trains are generally powered by multiple locomotives. The engineer and fireman in the lead locomotive control that locomotive and remotely control the other locomotives in the train. Control of the locomotives in a train is accomplished by wireless radio control through a device such as a GE-Harris controller, sometimes called a GE-Harris Locontrol.

Additionally, because the days of the caboose are long gone, an end-of-train (EOT) device is used, which device is a radio receiver/transmitter, referred to as a transceiver, which lets the engineer know, through a head-of-train (HOT) device located in the lead locomotive, that the train is still intact and that the last car in the train is still with the remainder of the train.

Devices such as the GE-Harris Locontrol and the EOT/HOT device are well known to those of ordinary skill in the art. Both devices, however, encounter significant problems when the train enters a tunnel, as these devices use UHF, or other suitable, radio signals, which signals are not reliably transmitted in tunnels. Particularly in the case of long trains and long tunnels, signals from the EOT are completely cut off. While the GE-Harris Locontrol may work with locomotives that are immediately adjacent one another, given the situation as occurs in many places, particularly in the western United States, wherein helper locomotives are inserted into the middle and at the end of the train, control of the remote locomotives by radio signals is not reliable due to the distance between the system components operating on the same train.

A known solution to this problem is to place store-and-forward repeaters along the length of a tunnel. These devices, however, are both costly and somewhat delicate, and required constant maintenance in the tunnel proper to insure safe train operation. Working in an active tunnel carries a certain amount of risk, particularly in lengthy tunnels.

The communication system of the instant invention overcomes these problems by providing an amplified distributed antenna network including receiver/repeater/transmitters to assist communications within a tunnel, to extend the range of radio signals generated by monitoring and control systems carried on board railroad trains to provide safe operation thereof.

SUMMARY OF THE INVENTION

The radio communications system of the invention is intended for use by trains in a tunnel. The system provides an amplified, distributed antenna network. This system includes an antenna subsystem which incorporates a radiating coaxial cable disposed along the length of the tunnel and extending beyond the portals thereof. Plural bi-directional, in-line radio-frequency amplifiers are inserted along the length of the radiating coaxial cable at predetermined intervals for amplifying the RF signals carried by the radiating coaxial cable. A monitoring repeater and a control repeater are provided along with an interface for joining the two repeaters to the radiating coaxial cable. A monitoring subsystem includes an end-of-train device and a head-of-train device. A control subsystem includes the control encoder located in a lead locomotive for encoding control input signals for the lead locomotive, a control transmitter for transmitting the encoded control signal to other locomotives, and a control receiver located in each other locomotive for receiving the encoded control signal.

An object of the invention is to provide a communications system which will provide continuous monitoring and control signals for a railroad train transiting a tunnel.

Another object of the invention is to provide a communications system which allows both monitoring and control of a railroad transiting a tunnel.

A further object of the invention is to provide a communication system which includes mobile data and voice transmission.

These and other objects and advantages of the invention will become more fully apparent as the description which follows is read in conjunction with the drawings.

DETAILED DESCRIPTION OF THE PREFERRED EMBODIMENT

Figure 1:
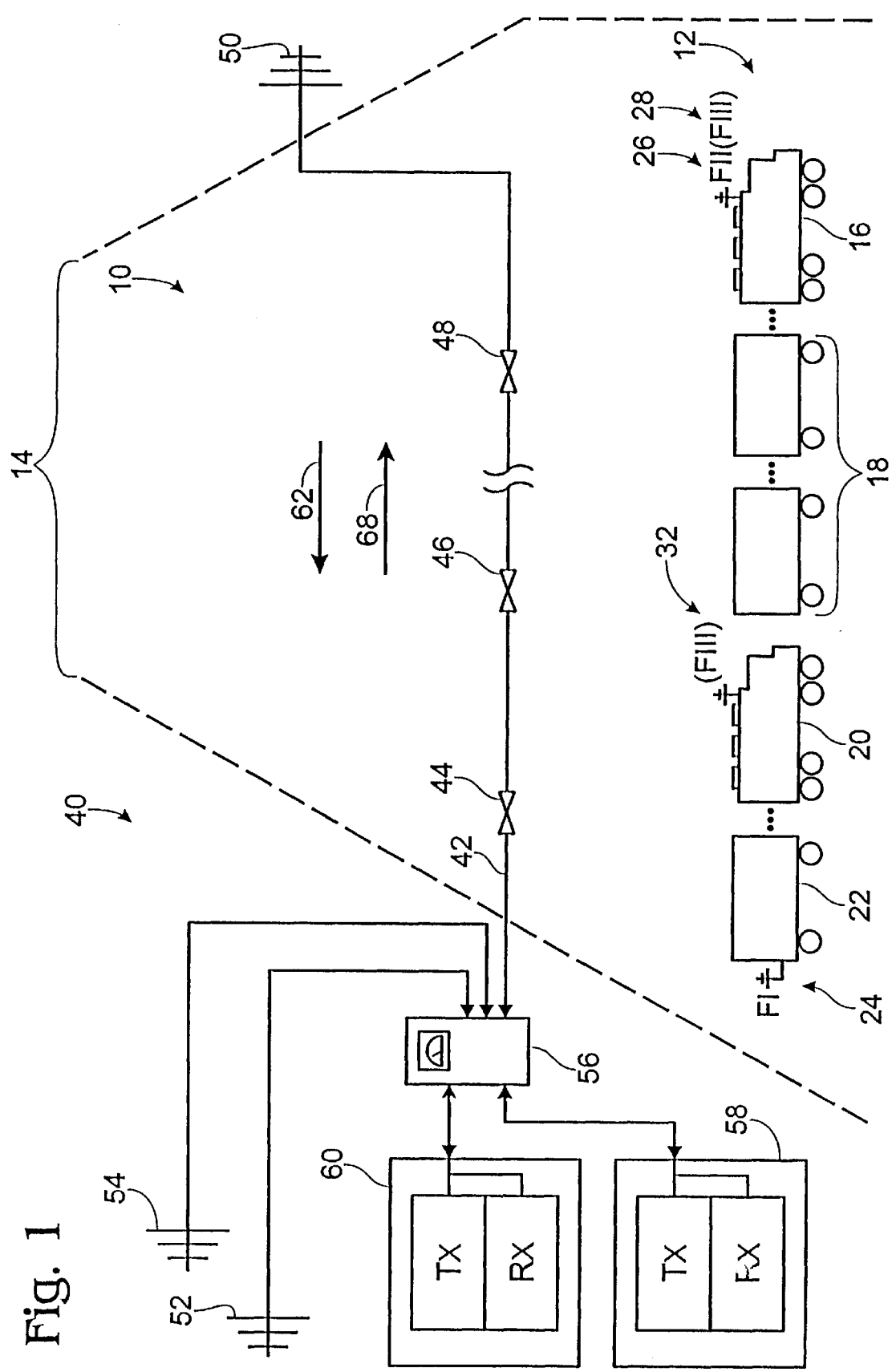
FIG. 1 is a block diagram of the communications system of the invention.

Referring now to FIG. 1, the communications system of the invention is depicted generally at 10. System 10 is intended for use with a railroad train, depicted schematically at 12, as train 12 transits a tunnel, depicted at 14.

To understand the operation of system 10, it is first necessary to understand the configuration of train 12. Train 12 includes a head, or control, locomotive 16, which carries the engineers and fireman. Additional locomotives may be coupled directly to control locomotive 16, depending on the length of train 12. A first collection of rolling stock cars 18 is located aft of locomotive 16. In the embodiment depicted, a helper locomotive 20 is depicted and is located intermediate the ends of train 12. Another collection of rolling stock cars 22 is depicted between helper locomotive 20 and the end of train 12. It should be appreciated that in many instances, train 12 may include six or more locomotives and a hundred or more cars, constituting the rolling stock.

A monitoring subsystem is included in train 12 and includes an end-of-train (EOT) device 24, which sends a first status signal at a first predetermined interval, and is also operable to receive a second status signal. A head-of-train (HOT) device 26 is located in the lead locomotive 16, and is operable for sending a second status signal at a second, less frequent, predetermined interval and for receiving the first status signal from EOT device 24. This is known as two-way mode.

The monitoring subsystem includes the end-of-train/head of train includes a data transceiver mounted on the lead locomotive and another one located at the end of the train.

The EOT unit transmits a signal which is normally received in open space by the head-of-train unit mounted in the lead locomotive, which is monitored by the engineers. The head-of-train transmits a less frequent message back to the EOT unit. When the train is in a tunnel environment, without the communication system of the invention, the signal is blocked or shielded from reaching the companion unit.

The monitoring subsystem operates at prescribed frequencies which are standardized throughout the railroad industry. The end-of-train device transmits at 457.9375 MHz, which is the same frequency that the HOT device receives on. The HOT, in turn, transmits at 452.9375 MHz.

A control subsystem is provided and includes, in lead locomotive 16, a control encoder for encoding control input signals for the lead locomotive and a control transmitter for transmitting a the encoded control signal generated from the encoded control input signal. Each helper locomotive includes therein a control receiver and control decoder 32. The control receiver receives the encoded control signal while the control decoder decodes the encoded control signal into a control input signal that is used to control the helper locomotive. The control subsystem operates at a number of frequencies, again which are predefined and are identified as: F1: 452.925 MHz; F2: 452.950 MHz; F3: 457.925 MHz; and F4: 457.950 MHz. It is foreseeable that other frequencies may be used in the future.

System 10 includes an antenna subsystem, shown generally at 40, which subsystem is operable to receive and send RF signals. Subsystem 40 includes a radiating coaxial cable 42, which is disposed along the length of tunnel 14 and extends beyond either end thereof. Cable 42 is "leaky", and allows the RF signals carried therealong to radiate therefrom so as to be received by the various receivers in the system. Cable 42 may be manufactured with a ribbed surface to promote the RF leakage effect, or, cable 42 may be conventional coaxial cable that is equipped with a RF leak-promoting device along the length thereof. In-line, bi-directional amplifiers 44, 46, and 48 are provided, in the preferred embodiment, at 1,000 foot intervals, along the length of coaxial cable 42 to maintain a high signal level throughout the length of tunnel 14. A UHF antenna 50 is located outside of one end of tunnel 14, while a pair of UHF antennas 52, 54 are located outside the other end of tunnel 14. Antennas 52, 54 are connected to an interface unit 56, which in turn is connected to a monitoring store-and-forward repeater 58 and a control store-and-forward repeater 60. The antenna subsystem is an active, or distributed, antenna system.

Interface unit 56 connects directly to antenna ports in store-and-forward repeaters 58, 60, each of which has a receiver portion (Rx) and a transmitter portion (Tx). Interface 56 will be described in greater detail later herein.

Figure 2:
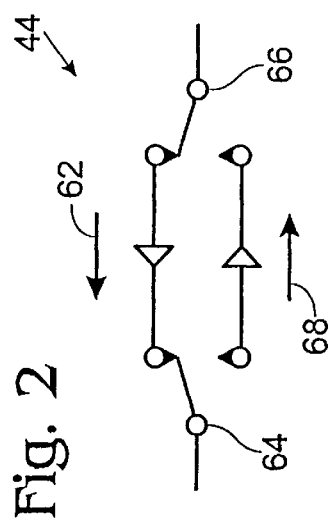
FIG. 2 is a schematic diagram of an in-line amplifier of the invention in an "at rest" condition.

The bi-directional, in-line amplifiers which are spaced along radiated coaxial cable 42 provide an amplification for the RF signal being carried in antenna 42 that allows both the monitoring and control subsystems to function. The bi-directional, in-line amplifiers, and now referring to FIG. 2, with amplifier 44 as an example, provide automatic switching to allow a signal to pass there through upon receipt of an appropriate 60 MHZ pilot activation signal. As shown in FIG. 2, the amplifier is in an "at rest" condition with a signal being able to flow in the direction of arrow 62. In the event that a 60 MHz signal is received opposite to flow 62, switches 64, 66 would change positions, allowing signal to flow in the direction of arrow 68. The combination of interface 56 and the bi-directional, in-line amplifiers require only a single store-and-forward repeater for each of the monitoring and control subsystems. It will be appreciated that the antenna subsystem of the invention is operable to transmit both data and voice signals, with up to 7 Mhz reverse split, e.g. EOT/HOT plus the Harris channels for control data.

Figure 3:
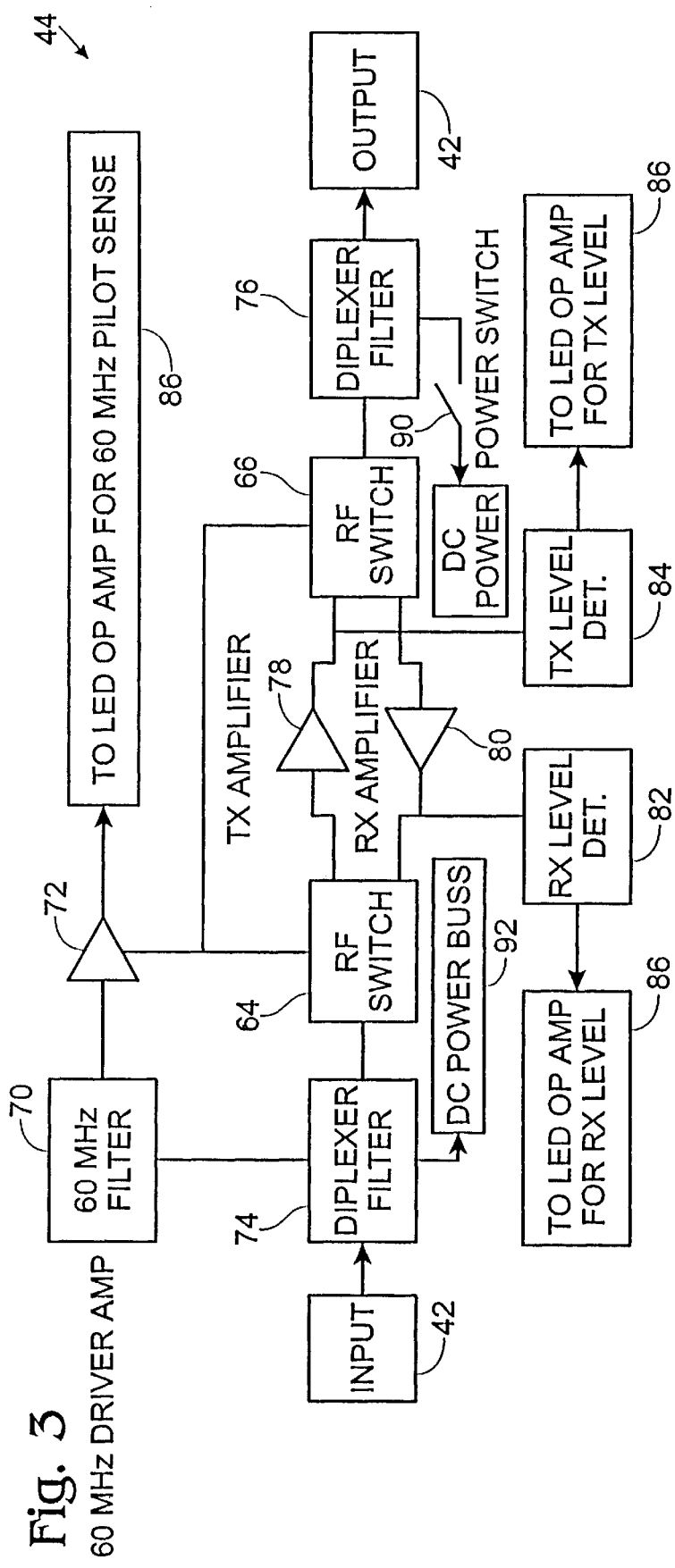
FIG. 3 is a block diagram of the in-line amplifier of the invention.
Figure 4:
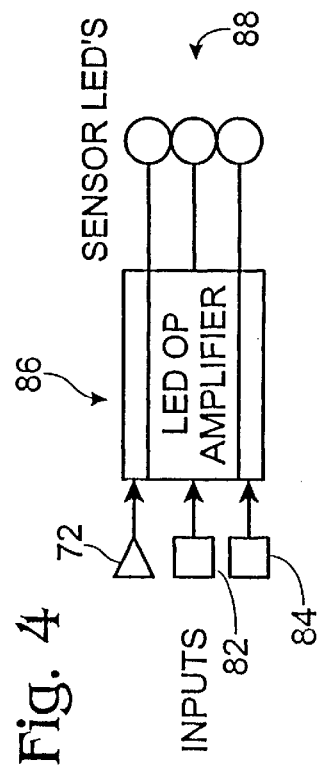
FIG. 4 is a schematic diagram of an LED op amp of the invention.

Referring now to FIG. 3, amplifier 44 will be described in greater detail. As previously noted, bi-directional, in-line amplifier 44 includes a pair of RF switches 64, 66. Initially, a 60 MHz filter 70 is provided, which is connected to an op amp 72 and a diplexer filter 74. A similar diplexer filter 76 is located at the other end of the bi-directional, in-line amplifier. A transmitter amplifier 78 and a receiver amplifier 80 are provided between RF switches 64, 66. A receive level detector 82 and a transmission level detector 84 are provided. Referring momentarily to FIG. 4, a LED op amp is depicted generally at 86 and includes inputs from op amp 72, receive level detector 82, and transmission level detector 84. Assuming that the signal flowing through those particular portions of the circuit are acceptable, appropriate LEDs, shown generally at 88, will illuminate to indicate proper status of the system, including RF output energy switch mode operation, DC voltage and receive RF level. Finally, a DC power switch 90 is provided to turn the amplifier on and off, which switch is connected to a DC power bus 92. DC power bus 92 may needed to be installed in long tunnels where other forms of DC power are neither feasible nor safe, i.e., DC power may come from batteries, however, replacement of batteries in long tunnels may be exceptionally hazardous to workers tasked with removing and replacing discharged batteries. The bi-directional amplifiers of the invention are powered by such DC power as is superimposed across the cable center conductor and outer shielding.

Bi-directional, in-line amplifiers operate at 12 volts DC at 30 ma. The RF input has a −10 dB transmit path and the amplifier provides an RF gain of +23 dB. The max RF out put is 40 mw. Likewise, changes in control signals must be received substantially simultaneously by all locomotives to insure that all locomotives are moving at the same speed. In the tunnel, UHF signals from the monitoring and control subsystems are normally blocked by the shielding effect of the tunnel walls, floor and roof, keeping the signals from reaching the receiving units. The active antenna system of the invention keeps the transmitters and receivers in constant communication via a repeater in interface 56. In this system, when a 60 MHz signal is received at Tx amplifier 78, and the system is in a receive mode, RF switches 64, 66 reverse, allowing the carrier signal to transit the bi-directional, in-line amplifier, and boosting the signal to +23 dB. In rest mode, the signal path is through Rx amplifier 80, and the signal is amplified up to +23 dB, which amount is adjustable by 15 dB.

Figure 5:
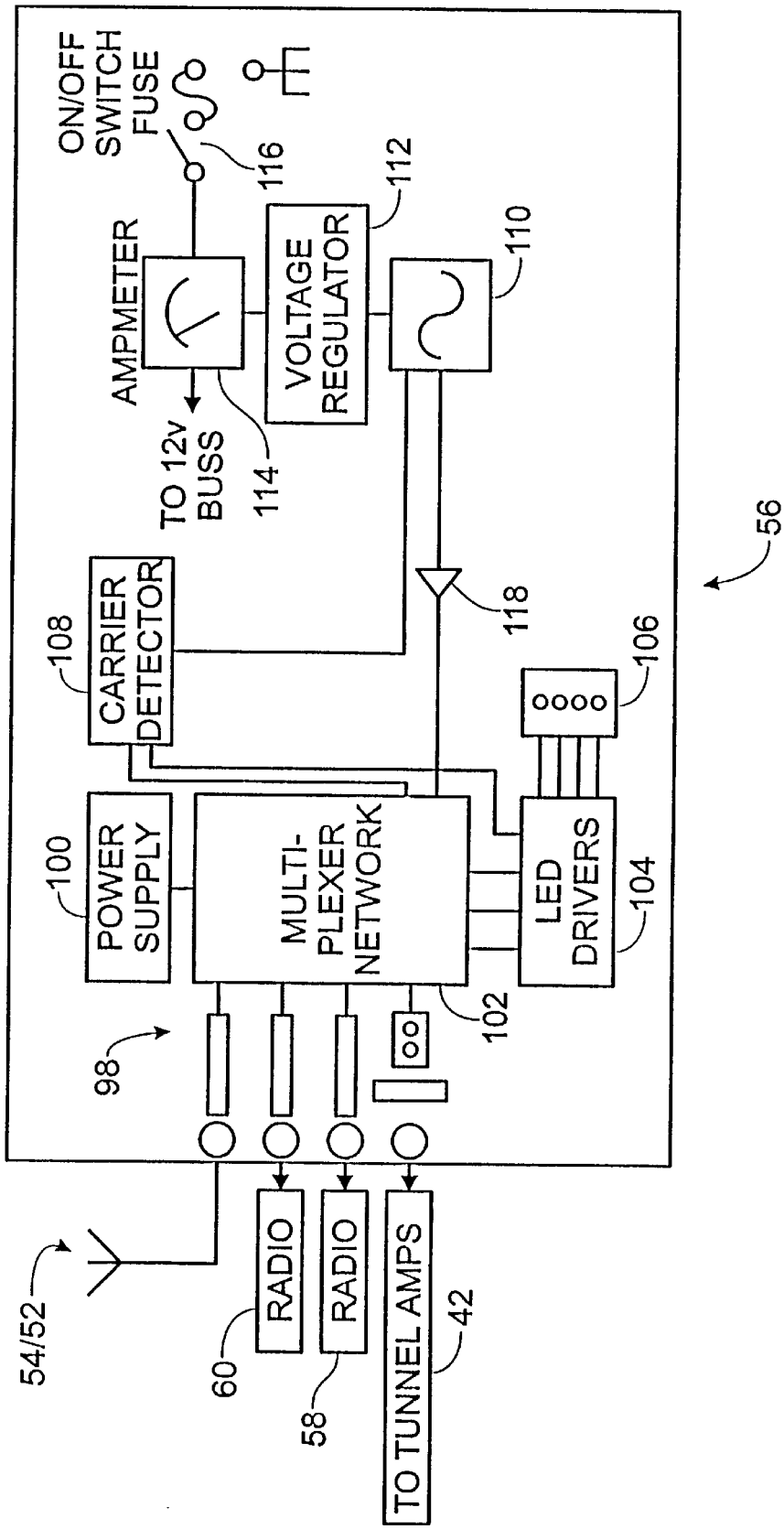
FIG. 5 is a block diagram of a UHF-based interface of the invention.

Referring now to FIG. 5, interface 56 will be described in greater detail. Interface 56 operates nominally at 12 volts DC at 3 amps. It has an RF input range of 1–10 watts and an RF output plus 25 DB. Its frequency range is 400 to 500 MHz, allowing it to operate for both the monitoring and control subsystems. Interface 56 includes an array of connecting jacks 98 for connecting the interface to the surface antennas, 52, 54, monitoring repeater 58, control repeater 60, and antenna 42. A power supply 100 is provided to provided regulated power to a multiplexer network 102 and the other system components. Multiplexer network 102 isolates the EOT/HOT and distributed power repeaters and connects them to the tunnel and surface antenna network. Multiplexer 102 is connected to a LED driver 104 and, in turn, an LED interface status array 106, which is operable to report the operational status of interface 56. A carrier detector 108 detects the presence of an RF signal in the system, and triggers a pilot oscillator module 110 upon detection of a RF signal, which activates an op amp 118. A voltage regulator 112, amp meter 114 and an on/off switch-fuse 116 are provided. Signals received by interface 56 which trigger carrier detector 108 are passed, as appropriate to monitoring repeater 58, control repeater 60 and to antennas 42, 52 and 54.

As the EOT/HOT rely on responses to interrogation signals, in a two-way mode, to indicate that the train is intact, the bi-directional, in-line amplifiers must be capable of switching directions in a very short period of time. The sensing switch mechanism in all of the bi-directional, in-line amplifiers in the system must switch within 10 ms of receiving the 60 MHz carrier signal in order to complete the radio path between the control-only devices, otherwise, the controlled device will not receive the signal from the control device, and will report that the train has separated.

The communications system of the invention eliminates the need to use costly multiplex amplifier equipment, while still providing broad-band, multichannel operation. The bi-directional, in-line amplifiers require only modest filtering, gain factors are high while component count and cost is low. The system of the invention is capable handling the broad-band operation required by the EOT/HOT devices when such devices are operating in half-duplex mode, and provides a 5 MHz band-split which alternates between the transmit and receive signal.

Thus, a communications systems has been disclosed that allows the monitoring and control of a railroad train transiting long tunnels. Although a preferred embodiment of the invention has been disclosed herein, it should be appreciated that further modifications and variations may be made thereto without departing from the scope of the invention as defined in the appended claims.

I claim:

1. A radio communications system for use by trains in a tunnel, comprising:
   an antenna subsystem for receiving and sending RF signals, including:
      a surface antenna located beyond the tunnel portals thereof at either end thereof;
      a radiating coaxial cable located in and along the length of the tunnel;
      plural bi-directional, in-line amplifiers disposed along the length of said Radiating coaxial cable at predetermined intervals for amplifying RF signals therein;
      a monitoring repeater and a control repeater, and an interface for joining said monitoring repeater and said control repeater to said Radiating coaxial cable, wherein said interface corrects RF levels as said RF signals are received by said Radiating coaxial cable;
   a monitoring subsystem, including:
      an EOT device for sending a first status signal at a first predetermined interval and for receiving a second status signal;
      a HOT device for sending said second status signal at a second predetermined interval and for receiving said first status signal, wherein said antenna subsystem receives and transmits said first and second status signals when the train is at least partially in the tunnel; and
   a control subsystem, including:
      a control encoder located in a control train engine for encoding control input signals for said engine;
      a control transmitter for transmitting a control signal generated from the encoded control input signal;
      a control receiver located in a controlled train engine for receiving said control signal; and
      a control decoder for decoding said control signal into a control input signal for controlling said controlled engine.

2. The System of claim 1 wherein said bi-directional, in-line amplifiers include a switching mechanism for switching said bi-directional, in-line amplifier between a first direction send-and-receive condition and a second send-and-receive condition, and wherein said switching mechanism is controlled by the direction of a signal entering said bi-directional, in-line amplifier.

3. The system of claim 2 wherein said switching mechanism is responsive to a 60 MHz signal transmitted along said radiating coaxial cable.

4. A radio communications system for use by trains in a tunnel, comprising:
   an antenna subsystem for receiving and sending RF signals, including:
      a radiating coaxial cable located in and along the length of the tunnel and extending beyond the portals at least one end thereof;
      a surface antenna system located outside of the tunnel;
      plural bi-directional, in-line amplifiers disposed along the length of said Radiating coaxial cable at predetermined intervals for amplifying RF signals therein, including a switching mechanism for switching said bi-directional, in-line amplifier between a first direction send-and-receive condition and a second send-and-receive condition, and wherein said switching mechanism is controlled by the direction of a signal entering said bi-directional, in-line amplifier;
      a monitoring repeater and a control repeater, and an interface for joining said monitoring repeater and said control repeater to said Radiating coaxial cable, wherein said interface corrects RF levels as said RF signals are received by said Radiating coaxial cable;
   a monitoring subsystem including:
      an EOT device for sending a first status signal at a first predetermined interval and for receiving a second status signal;
      a HOT device for sending said second status signal at a second predetermined interval and for receiving said first status signal, wherein said antenna subsystem receives and transmits said first and second status signals when the train is at least partially in the tunnel; and
   a control subsystem, including:
      a control encoder located in a control train engine for encoding control input signals for said engine;
      a control transmitter for transmitting a control signal generated from the encoded control input signal;
      a control receiver located in a controlled train engine for receiving said control signal; and
      a control decoder for decoding said control signal into a control input signal for controlling said controlled engine.

5. The system of claim 4 wherein said switching mechanism is responsive to a 60 MHz signal transmitted along said radiating coaxial cable.

* * * * *